United States Patent
Arwatz et al.

(10) Patent No.: US 10,288,492 B2
(45) Date of Patent: May 14, 2019

(54) FAST RESPONSE TEMPERATURE SENSOR

(71) Applicants: Gilad Arwatz, Princeton, NJ (US);
Yuyang Fan, Princeton, NJ (US);
Carla Bahri, Princeton, NJ (US);
Marcus Hultmark, Princeton, NJ (US)

(72) Inventors: Gilad Arwatz, Princeton, NJ (US);
Yuyang Fan, Princeton, NJ (US);
Carla Bahri, Princeton, NJ (US);
Marcus Hultmark, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 202 days.

(21) Appl. No.: 15/287,808

(22) Filed: Oct. 7, 2016

(65) Prior Publication Data
US 2017/0138799 A1   May 18, 2017

Related U.S. Application Data

(60) Provisional application No. 62/238,240, filed on Oct. 7, 2015.

(51) Int. Cl.
*G01K 1/18* (2006.01)
*G01K 13/02* (2006.01)
*G01K 7/18* (2006.01)

(52) U.S. Cl.
CPC .............. *G01K 1/18* (2013.01); *G01K 7/18* (2013.01); *G01K 13/02* (2013.01)

(58) Field of Classification Search
CPC .......................................................... G01K 1/18
See application file for complete search history.

(56) References Cited

U.S. PATENT DOCUMENTS

| | | | | |
|---|---|---|---|---|
| 7,501,626 | B2 * | 3/2009 | Wood | G01J 3/42 250/338.1 |
| 2011/0308312 | A1 * | 12/2011 | Moro | G01P 5/10 73/204.27 |

OTHER PUBLICATIONS

Abstract of presentation titled "Fast response temperature and humidity sensors for measurements in high Reynolds number flows", given Nov. 24, 2013 at the 66th Annual Meeting of the APS Division of Fluid Dynamics.*
Vallikivi (Turbulence Measurements with a Nano-scale Thermal Anemometry Probe. Master's thesis. Chalmers University of Technology, 2010. Göteborg, Sweden.).*
Arwatz et al ("Development and Characterization of a Nano-scale Temperature Sensor (T-NSTAP) for Turbulent Temperature Measurements." Measurement Science and Technology 26, No. 3 (Feb. 2, 2015): 035103. doi:10.1088/0957-0233/26/3/035103.).*
Smits A. J., Perry A. E. and Hoffmann P. H. (1978) "The response to temperature fluctuations of a constant-current lot-wire anemometer" J. Phys. E: Sci. Instrum. (11) 909.

(Continued)

*Primary Examiner* — Clayton E. LaBalle
*Assistant Examiner* — Leon W Rhodes, Jr.
(74) *Attorney, Agent, or Firm* — Meagher Emanuel Laks Goldberg & Liao, LLP

(57) ABSTRACT

In the present invention, a temperature sensor system and methods for using the apparatus are disclosed, the temperature sensor having particular thermal-inertia time constants. More specifically, the temperature sensor system comprises prongs having a defined l/d ratio range, a sensing element having a low volume, and constant-current circuitry.

15 Claims, 6 Drawing Sheets

(56) References Cited

OTHER PUBLICATIONS

Arwatz G., Bahri C., Smits A. J. and Hultmark M. (2013) "Dynamic calibration and modeling of a cold wire for temperature measurement" Meas. Sci. Technol. (24) 125301.
Mydlarski L. and Warhaft Z. (1998) "Passive scalar statistics in high-Péclet-number grid turbulence" J. Fluid Mech. (358) 135-75.
Wyngaard J. C. (1971) "Spatial resolution of a resistance wire temperature sensor" Phys. Fluids (14) 2052-4.
Hojstrup J., Larsen S. E. and Rasmussen K. (1976) "Dynamic calibration of temperature wires in still air" DISA Inform. (20) 22-30.
Antonia R. A., Browne L. W. B. and Chambers A. J. (1981) "Determination of time constants of cold wires" Rev. Sci. Instrum. (52) 1382-5.
Paranthoen P., Petit C. and Lecordier J. C. (1982) "The effect of the thermal prong-wire interaction on the response of a cold wire in gaseous flows (air, argon and helium)" J. Fluid Mech. (124) 457-73.
Petit C, Paranthoen P., Lecordier J. C. and Gajan P. (1985) "Dynamic behaviour of cold wires in heated airflows (300<T<600 K)" Exp. Fluids (3) 169-73.
Bailey S. C. C., Kunkel G. J., Hultmark M., Vallikivi M., Hill J. P., Meyer K. A., Tsay C., Arnold C. B. and Smits A. J. (2010) "Turbulence measurements using a nanoscale thermal anemometry probe" J. Fluid Mech. (663) 160-79.
Vallikivi M., Hultmark M., Bailey S. C. C. and Smits A. J. (2011) "Turbulence measurements in pipe flow using a nano-scale thermal anemometry probe" Exp. Fluids (51) 1521-7.
Hultmark M., Vallikivi M., Bailey S. C. C. and Smits A. J. (2012) "Turbulent pipe flow at extreme reynolds numbers" Phys. Rev. Lett. (108) 094501.
Vallikivi M. and Smits A. J. (2014) "Fabrication and characterization of a novel nanoscale thermal anemometry probe" J. Microelectromech. Syst. (23) 899-907.
Chou T-K A and Najafi K (2002) "Fabrication of out-of-plane curved surfaces in Si by utilizing RIE lag" The 15th IEEE Int. Conf. on Micro Electro Mechanical Systems (Las Vegas, NV. USA. Jan. 24, 2002) pp. 145-148.
Rao M. P., Aimi M. F. and MacDonald N. C. (2004) "Single-mask. 3D microfabrication of high-aspect-ratio structures in bulk silicon using reactive ion etching lag and sacrificial oxidation" Appl. Phys. Lett. (85) 6281-3.
Xiong X., Dallas T., Gangopadhyay S., Berg J. and Henryk T. (2010) "Design and analysis of a dual-mode mems micromirror" Micro Nanosyst. (2) 23-31.
Sirivat A. and Warhaft Z. (1983) "The effect of a passive cross-stream temperature gradient on the evolution of temperature variance and heat flux in grid turbulence" J. Fluid. Mech. (128) 323-46.
Jayesh, Tong C. and Warhaft Z. (1994) "On temperature spectra in grid turbulence" Phys. Fluids (6) 306-12.
Pumir A., Shraiman B. I. and Siggia E. D. (1991) "Exponential tails and random advection" Phys. Rev. Lett. (66) 2984-7.
Kerstein A. R. (1991) "Linear-eddy modelling of turbulent transport. Part 6. Microstructure of diffusive scalar mixing fields" J. Fluid Mech. (231) 361-94.
Jayesh and Warhaft Z (1991) "Probability distribution of a passive scalar in grid-generated turbulence" Phys. Rev. Lett. (67) 3503-6.
Jayesh and Warhaft Z (1992) "Probability distribution, conditional dissipation, and transport of passive temperature fluctuations in grid-generated turbulence" Phys. Fluids A (4) 2292-307.

* cited by examiner

FAST RESPONSE TEMPERATURE SENSOR

CROSS-REFERENCE TO RELATED APPLICATIONS

This application claims the benefit of U.S. Provisional Application No. 62/238,240, filed Oct. 7, 2015, which is hereby incorporated in its entirety by reference.

STATEMENT REGARDING FEDERALLY SPONSORED RESEARCH OR DEVELOPMENT

This invention was made with government support under Grant No. N00014-12-1-0875 awarded by the Office of Naval Research. The government has certain rights in the invention.

BACKGROUND OF THE INVENTION

Temperature measurement in turbulent flow is required in many industries, from avionics to HVAC to chemical manufacturing. In many applications, temperature is a critical parameter that must be monitored or measured as accurately as possible. These turbulent temperature measurements are commonly performed using cold-wire anemometers. A cold-wire typically consists of a wire filament designed to adapt to the ambient temperature with a resulting change of its resistance. The temperature of the fluid is generally related to the resistance of the wire through a static calibration method. However, any static calibration implicitly assumes that the sensitivity is independent of frequency, that is, that the frequency response is flat.

It is well known that the frequency response of a cold-wire is affected by the heat transfer from the sensing element or wire to the stubs, from the stubs to the prongs, and from the prongs to the probe body itself, a phenomenon known as end-conduction. A recent study has shown that this effect is more severe than previously thought, and can lead to significant measurement errors. A typical approach to solving this is to simply make the wire length-to-diameter aspect ratio, l/d, very large to avoid such end-conduction effects. However, since the smallest diameter used, typically, is on the order of 1 µm, this implies that the wires need to be on the order of a millimeter. Although a long wire reduces the end-conduction, the spatial resolution is also reduced. Other studies have pointed out that minimizing end-conduction effects can result in an increase of the total error due to spatial filtering. One study, using a cold-wire with 0.63 µm diameter and l/d=1500, estimated that the scalar dissipation was underestimated by approximately 30%.

Therefore, there is a need for a sensor capable of more accurately measuring temperature in turbulent flow.

BRIEF SUMMARY OF THE INVENTION

The present invention is directed to devices and methods for sensing temperature, and specifically relating to devices having cold-wires with particular dimensions.

Among the many different possibilities contemplated, the cold-wires and prongs may be comprised of one or more layers of metal, especially gold or platinum, may advantageously have cross-sections or volumes within preferred ranges. Further, the sensor may be adapted for measuring temperatures at a wide range of frequencies, or for acquiring temperature data in a variety of applications.

BRIEF DESCRIPTION OF DRAWINGS

The invention will be described hereinafter with reference to non-limitative examples, which are provided for explanatory, non-limitative purposes in the accompanying drawings. These drawings illustrate different aspects and embodiments of this invention and, where appropriate, the structures, components, materials and/or similar elements are indicated in the different figures with similar reference numbers.

DETAILED DESCRIPTION OF THE INVENTION

Figure 1:
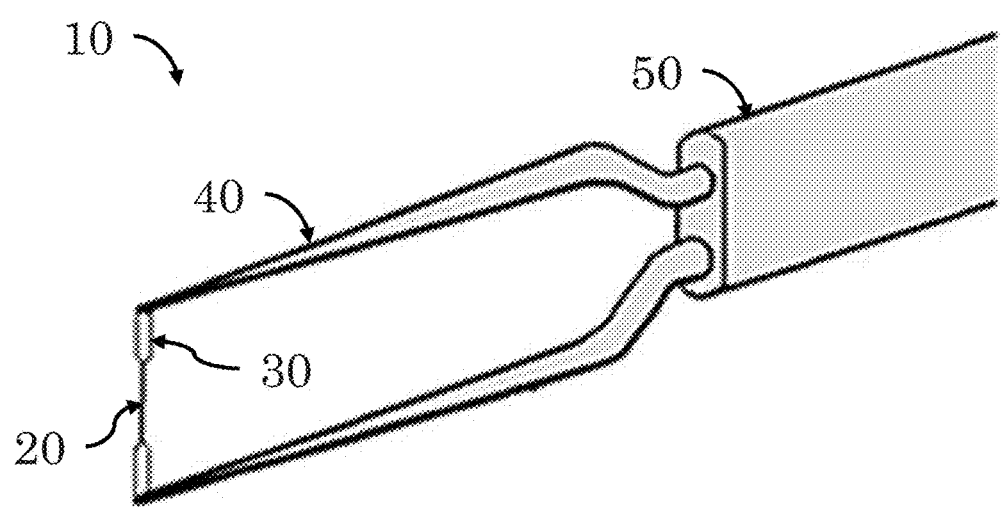
FIG. 1 illustrates a cold-wire anemometer.

While the invention is susceptible to various modifications and alternative constructions, some of the illustrated embodiments are shown in the drawings and will be described below in detail.

It must be understood, however, that there is no intention to limit the invention to the specific illustrated embodiments, but, on the contrary, the invention intends to cover all the modifications, alternative constructions and equivalents that fall within the scope of the invention as defined in the claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

The singular forms "a", "an", and "the" include plural referents unless the context clearly dictates otherwise.

The use of "such as", "etc.", "or" indicates non-exclusive alternatives without limitations, unless otherwise indicated.

The use of "includes" means "includes, but is not limited to", unless otherwise indicated.

The use of "wire" and "sensing element" are used interchangeably.

FIG. 1 illustrates a cold-wire anemometer 10, which comprises a free-standing sensing element 20 suspended between stubs 30. The stubs are connected to, or integral to, prongs 40 which are connected to holder 50.

Unlike previous cold wire designs, embodiments of the present invention take both the temporal and spatial resolution into account. Since the attenuation due to both spatial and temporal filtering is Reynolds number dependent, the optimal design of such a sensor will vary among applications.

Spatial filtering is governed by the ratio of the length of the wire and the smallest turbulent length scales in the flow. Thus, a wire that shows severe spatial filtering in one flow can be unaffected by spatial filtering in another. Consequently, minimizing spatial filtering is achieved by reducing the length of the sensing element, l. A decreased length reduces the thermal mass of the wire filament, which is desired, but it also increases the end conduction effect with low-frequency attenuation as a result. These thermal effects and trade-offs can be illustrated via a lumped parameter model.

With a lumped parameter approach, the heat transfer rates are modeled with thermal resistors and heat accumulated in each element with thermal capacitors while assuming the temperature to be constant in each of these parts. A key factor in this approach is the Biot number, a dimensionless ratio of convection to conduction resistance to heat transfer given by $Bi=hL_c/k$, where h is the heat transfer coefficient, $L_c$ is a characteristic length and k is the thermal conductivity. The lumped parameter approximation is valid when Biot number is less than one for each element. The lumped parameter approach is expected to provide design guidelines relating basic parameters to system response. We note that each element of a cold wire (represented by a capacitor) is exposed to a heat flux (represented by a current going through a resistor), and therefore the model should include three series RC circuits in a parallel configuration. Moreover, the elements are connected to each other and therefore heat is conducted between adjacent elements represented by thermal contact resistance. Also, the prongs are connected to the holder which has a relatively large thermal mass and acts as a heat sink, and so conduction from the prongs 40 to the holder 50 should also be considered in the model.

Figure 2:
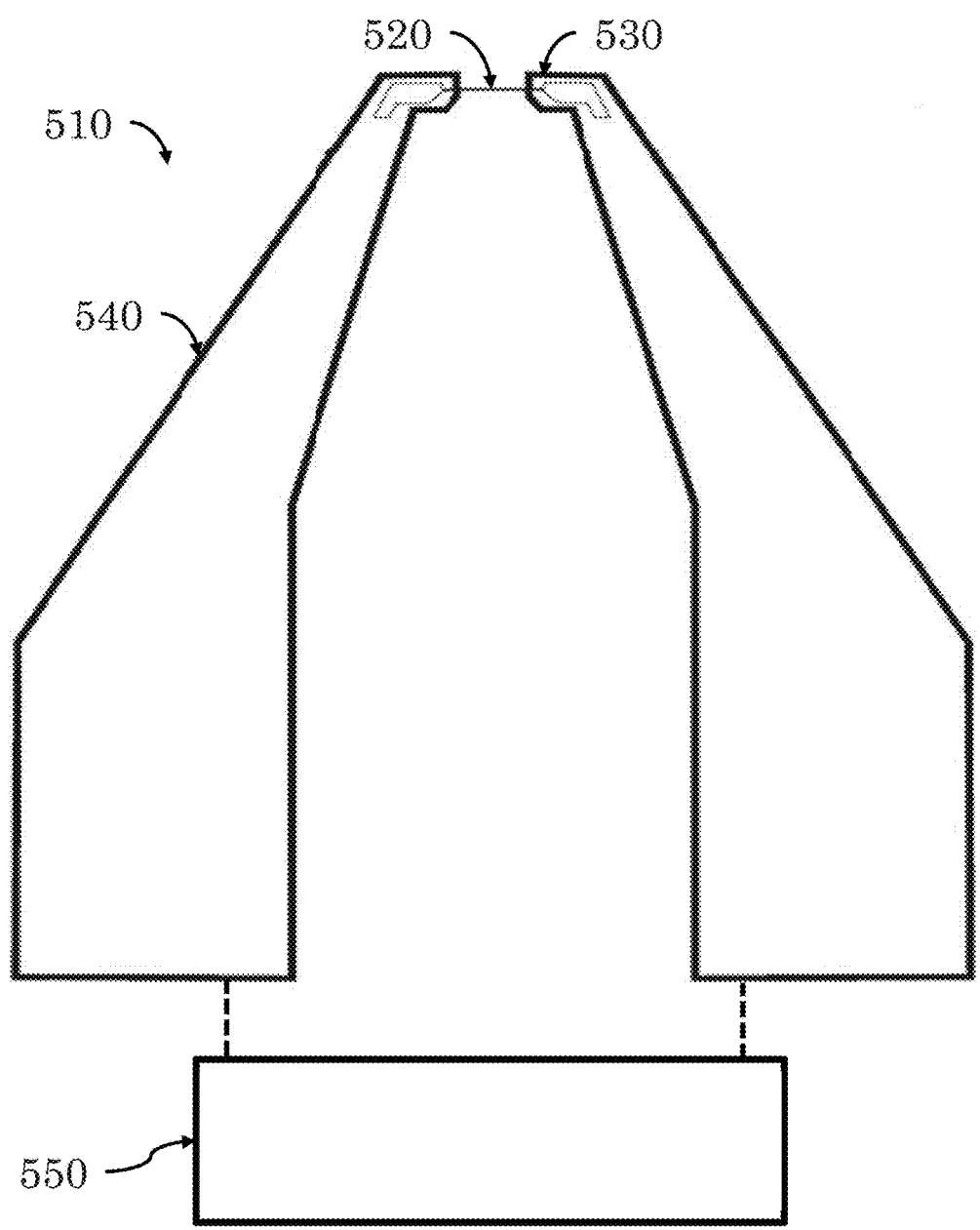
FIG. 2 illustrates a lumped capacitance model of a sensor.

The model presented in FIG. 2 represents half of the probe under the assumption that the probe behavior is symmetric. The voltage on each node represents the temperature, and the resistances $R_1$, $R_2$ and $R_3$ correspond to the heat transferred (either by radiation or convection) to the wire, the stubs and the prongs, respectively. Each of the resistances is given by $R_i=1/(h_i S_i)$, where $h_i$ is the heat transfer coefficient and $S_i$ is the surface area receiving the applied heat. The capacitors $C_1$, $C_2$ and $C_3$ represent the heat accumulated and are related to the physical properties of each element according to $C_i=\rho_i V_i c_i$, with $\rho_i$ being the density of the element, $V_i$ the volume and $c_i$ the heat capacity. The three elements are coupled to each other through the contact resistances $R_{12}$ and $R_{23}$, given by $1/(k_c S_c)$, where $k_c$ is the thermal contact conductivity and $S_c$ is the contact surface area. Finally, the prongs conduct heat to the holder, an effect modeled by the resistance $R_4$, connecting the prongs to ground and given by $l/(kS)$ with l being the length of the unheated prongs, k the thermal conductivity and S the cross-sectional area.

The heat transfer coefficients $h_i$ depend on the nature of the heat transfer. For the heat transfer due to radiation, this model assumes the source of radiation is a laser beam. In such cases, the heat transfer coefficient is mainly a function of the position of each element with respect to the laser beam and hence the thermal effect of the laser beam is expressed as a space-dependent boundary condition on each element. This effect is due to the fact that the intensity of a laser beam follows a Gaussian distribution with its maximum located at the center. The variation of the heat transfer coefficient with radial distance r is therefore given by $h=h_o e^{-2r^2/w_o^2}$ where $h_0$ is the maximum heat transfer coefficient at the center of the beam, and $w_0$ is the distance from the center of the beam at which the intensity falls to $1/e^2$ of its maximum value.

The characteristic heat transfer coefficients for the wire filament, the stubs and the prongs were found by calculating the weighted average through a numerical integration along the element. The maximum heat transfer coefficient $h_o$ is calculated from $$h_o = \frac{P}{\pi r_c^2 (T_0 - T_\infty)}$$

where P is the laser power, $T_o$ is the temperature of the sensor measured for a corresponding power and $T_\infty$ is the ambient temperature. In addition, $r_c$ is a characteristic radius of the beam according to $$r_c = \frac{\int_0^\infty r e^{-2r^2/w_0^2} dr}{\int_0^\infty e^{-2r^2/w_0^2} dr}.$$

For the heat transfer due to convection, the heat transfer coefficient was obtained using Churchill and Bernstein's correlation for the Nusselt number for a cylinder in cross flow, where $$Nu = \frac{h d_i}{k} = 0.3 + \frac{0.62 Re^{-1/2} Pr^{1/3}}{[1+(0.4/Pr)^{2/3}]^{1/4}} \left[1+\left(\frac{Re}{28200}\right)^{5/8}\right]^{4/5}.$$

Here, $d_i$ is the diameter of the element (wire filament, stubs or prongs), k is the thermal conductivity of the fluid, Pr=v/a is the Prandtl number with v the kinematic viscosity and a is the thermal diffusivity, and $Re=d_i U/v$ is the Reynolds number and U the fluid velocity. Note that other correlations of the heat transfer coefficient may be used for different geometries and flow conditions. After obtaining the characteristic heat transfer coefficient for each element (for either convection or radiation), an energy balance can be performed, which translates into a current balance on each node. Because $V_1$, $V_2$ and $V_3$ represent the temperatures of the wire filament, stubs and prongs respectively, the response is described by $$C_1 \frac{dV_1}{dt} = \frac{V_0 - V_1}{R_1} - \frac{V_1 - V_2}{R_{12}}$$
$$C_2 \frac{dV_2}{dt} = \frac{V_0 - V_2}{R_2} - \frac{V_1 - V_2}{R_{12}} - \frac{V_2 - V_3}{R_{23}}$$
$$C_2 \frac{dV_3}{dt} = \frac{V_0 - V_3}{R_3} - \frac{V_2 - V_3}{R_{23}} - \frac{V_3}{R_4}.$$

This system of differential equations may be solved by constructing a state-space representation, solving for each voltage in the frequency domain and transferring the results back to the time domain by performing an inverse Laplace transform.

The solutions are in the form of $$\frac{V_i(t)}{V_0} = 1 - \sum_{j=1}^{3} (A_{ji} e^{-2\pi f_{ji} t})$$

where j={1, 2, 3} corresponds to the wire filament, stubs and prongs, respectively, $f_j$ is the frequency and $A_j$ is the corresponding amplitude. When measuring temperature with a cold wire, one is essentially measuring the temperature of the wire filament and therefore the solution for $V_1$ is of interest from which, for i=1, this equation becomes $$\frac{T(t)}{T_0} = 1 - \sum_{j=1}^{3} (A_j e^{-2\pi f_j t})$$

where T (t) is the temperature of the wire filament.

Figure 3:
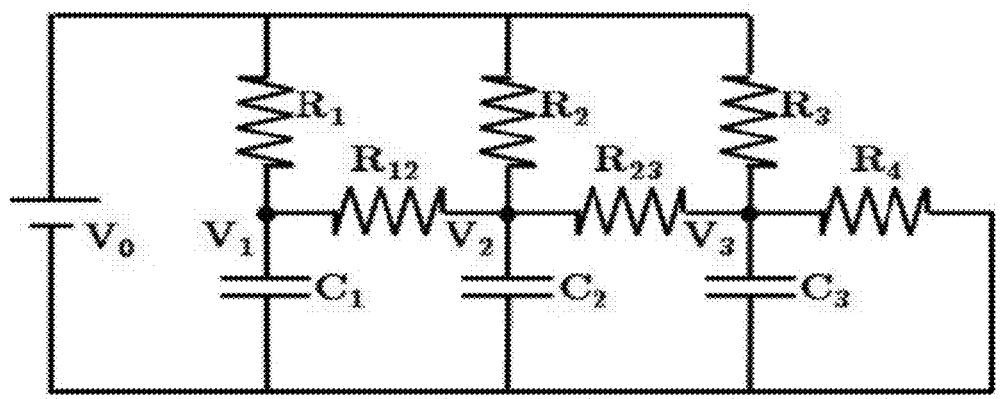
FIG. 3 is an exemplary Bode plot according to a cold-wire model.

The typical frequency response predicted by this model can be seen in an exemplary Bode plot (see FIG. 3) with a typical transfer function for a step input given by $$H(s) = \frac{(s - z_1)(s - z_2)}{(s - p_1)(s - p_2)(s - p_3)}$$

where $z_1$ and $z_2$ are the zeros of the system, and $p_1$, $p_2$ and $p_3$ are the poles which are related to the frequencies characterizing the system by $p_i = 2\pi f_i$. Specifically, $f_i$ is referred to as the roll-off frequency, which is found by solving for the poles of the system transfer function.

To summarize, a lumped parameter model of the temperature sensor (see FIG. 2), predicts that end-conduction effects, due to heat transfer from the wire filament to the prongs through the stubs, affect both high and low frequencies. An important parameter is the roll-off frequency of the wire filament, $f_i$. The model shows that increasing the diameter has the undesirable effect of decreasing the roll-off frequency, and hence one faces a trade-off between maximizing amplitude and frequency.

Figure 4:
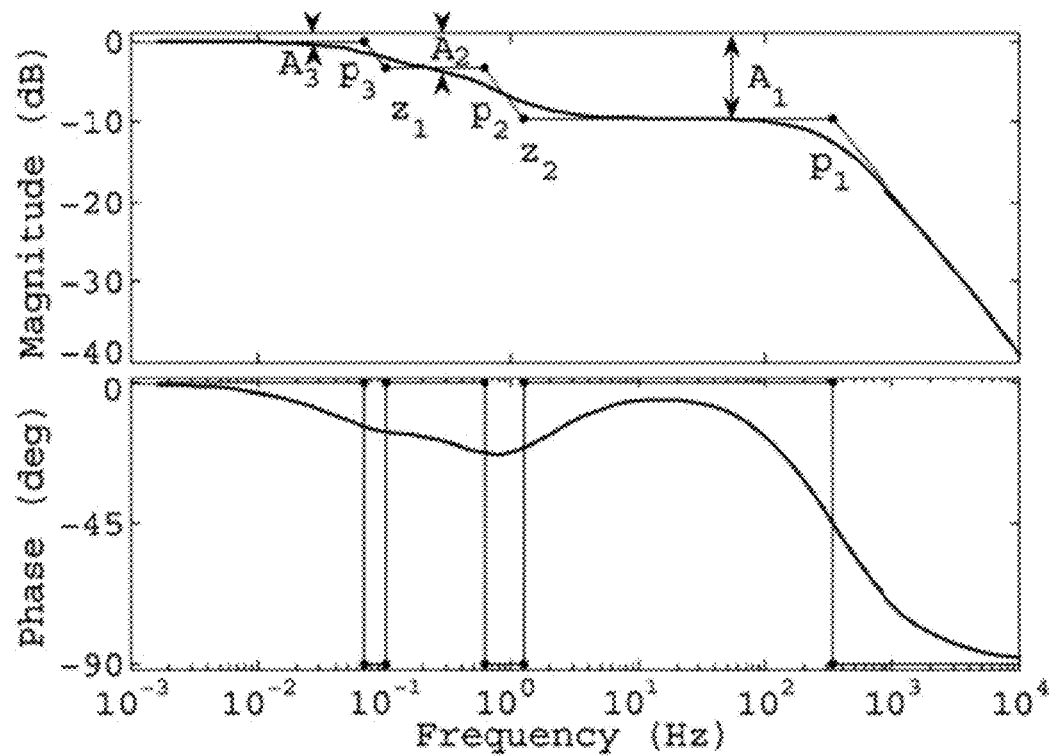
FIG. 4 is a graph of frequency and amplitude for a variety of diameters according to a cold-wire model.

This trade-off is illustrated in FIG. 4, where multiple frequency and amplitude curves are shown for different diameters. It is further shown that the data is collapsed when plotted against $l_1 d_1 / L d_2$, where $l_1$ and $d_1$ are the wire filament length and diameter respectively, L is the distance between the prongs and $d_2$ is the stubs' diameter. This figure clearly reveals the trade-offs between the design parameters of the cold-wire, which is very useful when designing an improved sensor.

The maximum amplitude that can be achieved for a specific probe is determined by the remaining elements, namely the prongs, the stubs and the interactions between them. The effect of the stubs is embedded in the results shown above since increasing the filament implies a decrease in the stub dimensions. In order to minimize attenuation, $l_3 / d_3$ should be minimized by reducing the length and increasing the cross-sectional area of the prongs.

These considerations lead to a design almost an order of magnitude smaller than any other temperature sensor, with increased roll-off frequency and reduced low frequency attenuation.

Figure 5:
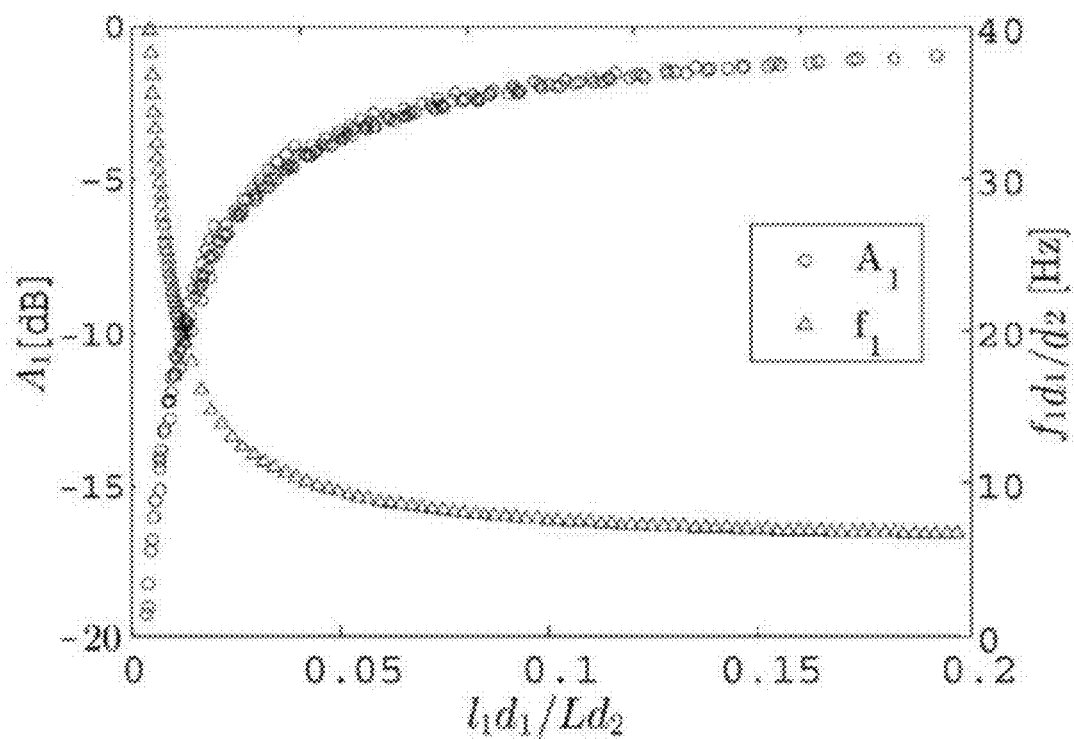
FIG. 5 depicts a top-down view of a cold-wire anemometer.

FIG. 5 illustrates one preferred embodiment of the prongs 540, stubs 530, and wire 520 of a cold-wire anemometer 510. The prongs may optionally be attached to a holder (not shown). In addition, the prongs 540, stubs 530, and/or wire 520 may be coupled to driving and/or measurement circuitry 550. Driving circuitry is configured to supply an electric current to the wire 520 to maintain the wire 520 at one of an approximately constant current. Measurement circuitry is configured to and/or to measure at least one of a current, voltage, or resistance of the wire 520.

The wire 520 may be comprised of any solid conductive material, although those materials with high thermal conductivities, preferably greater than 59 W/(m-K) at 20 degrees C., and more preferably greater than 300 W/(m-K) at 20 degrees C. This preferably utilizes materials such as platinum, and more preferably utilizes materials such as gold.

To obtain accurate measurements of temperature fluctuations, it is necessary to design a probe which has minimal end-conduction effects, yet is small enough to avoid spatial filtering. The dynamic response of the cold-wire should include the thermal-inertia time constant ($R_i C_i$) related to the wires, stubs, and prongs. In a preferred embodiment, each prong has a thermal-inertia time constant of less than 1.0 second, each stub has a thermal-inertia time constant of less than 0.1 seconds, and the wire has a thermal-inertia time constant of less than 30 micro seconds. In a more preferred embodiment, the prong thermal-inertia time constant is between and including 0.2 and 0.7 seconds, the stub thermal-inertia time constant is between and including 0.01 and 0.07 seconds, and the wire thermal-inertia time constant is between 1 and 17 microseconds.

Figure 6:
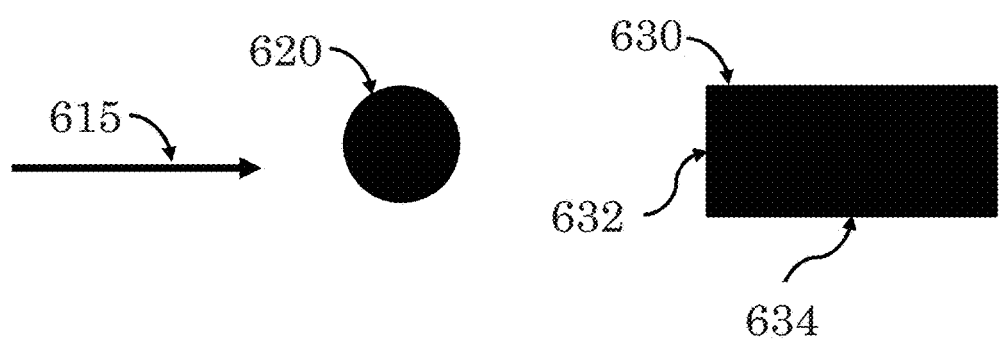
FIG. 6 illustrates two embodiments of cold-wire cross-sections.

Sensors with a wide variety of dimensions are envisioned. The cross-section of the wire may be almost any shape. Preferred embodiments are illustrated in FIG. 6. Given a general direction of flow 615, the wire may have a circular cross-section 620 with a specific diameter, or may have a rectangular cross section 630, with a thickness 632 and a width 634.

In one embodiment, the ratio of the length of the conductive material to the diameter or width of a rectangular cross-section of the conductive material is greater than 20. In one preferred embodiment, the ratio of the length of the conductive material to the diameter or width of a rectangular cross-section of the conductive material is between 50 and 200. More preferably, the ratio is between 75 and 150, and even more preferably, the ratio is between 90 and 110.

In other preferred embodiments the wire has a length between 150 and 250 μm, a width between 1 and 3 μm, and a thickness between 50 and 150 nm. In a more preferred embodiment, the wire has a length of between 175 and 225 μm, a width between 1 and 3 μm, and a thickness between 75 and 125 nm.

In other preferred embodiments, the volume of the wire is less than 1 picoliter. In a more preferred embodiment, the volume of the wire is less than 500 femtoliters. In an even more preferred embodiment, the volume of the wire is less than 100 femtoliters. In a still more preferred embodiment, the volume of the wire is less than 50 femtoliters.

The configuration—including but not limited to the dimensions and the materials of construction—of the sensor element determines its response to temperature changes of the surrounding fluid or medium. Certain response profiles are more desirable than others. In preferred embodiments, the sensor element is configured such that a one-degree C. change in the temperature of the medium surrounding the sensor results in energy storage in the sensor element of less than 300 pJ. In a more preferred embodiment, the one-degree C. change in the temperature of the medium surrounding the sensor results in energy storage in the sensor element of between and including 25 pJ and 250 pJ. In a still more preferred embodiment, the one-degree C. change in the temperature of the medium surrounding the sensor results in energy storage in the sensor element of between and including 50 pJ and 200 pJ.

The wires are suspended between the prongs. In preferred embodiments, this is done by suspending the wires between stubs on the prongs. These stubs may be constructed of almost any thermally conductive material, although a preferred embodiment utilizes stubs comprising platinum or gold. In addition, these stubs can be of a variety of dimensions, although preferred embodiments utilize stubs that have a larger diameter or cross-sectional area than the wire but have a shorter length. In a preferred embodiment, the ratio of the length of a stub to the diameter of that stub is less than about 3.

It is envisioned that the prongs may be designed in a variety of shapes and designs. While FIG. 5 illustrates one specific embodiment, other embodiments are envisioned. In preferred embodiments, each prong generally is short and squat—that is, each prong has an l/d ratio of approximately 1 to approximately 25, where l is the length of the prongs and d is the maximum diameter or width of the prong. In other embodiments, the each prong has an l/d ratio of approximately 3.5 to approximately 25. Further, these prongs may be made of almost any thermally conductive material, although preferred embodiments utilize prongs comprising gold or platinum. In one preferred embodiment, the prongs are comprised of platinum covered with gold. In another embodiment, the prongs are comprised of two or more layers of material, where a first layer has a higher thermal or electrical conductivity than a second layer.

These sensors are also typically mounted on a support, as these sensors would otherwise be relatively fragile or easy to deform, especially in turbulent flows. The supports can be almost any solid material, although preferred embodiments utilize supports comprising silicon.

A preferred embodiment of a sensor was constructed using the following methodology. First, the wire was patterned on a 100 mm diameter double-sided, polished, prime grade silicon wafer. To process the wafer, a 500 nm layer of silicon dioxide ($SiO_2$) was first deposited onto one side of the wafer using plasma-enhanced chemical vapor deposition (PECVD) as an insulating layer as well as for structural support during the 3D etching of the sensor. Wires are patterned using standard bilayer-resist photolithography. In this embodiment, 100 nm of platinum (Pt) was then sputtered onto the patterned wafer with 10 nm of chromium (Cr) underneath acting as an adhesive layer. The bilayer-resist ensures smooth wire edges after metal lift-off, which may result in more robust and durable sensing wires. The photolithography, metallization and lift-off processes are repeated on the same side of the wafer to attach a 200 nm thick layer of gold (Au) as the conducting prongs to the Pt wires. To create a more aerodynamic shape, reactive-ion etching (RIE)-lag was adapted to shape the sensor.

To measure temperature, a very small constant current is run through the wire. The methods for doing so are known to those skilled in the art. The current is generally the minimum possible current that allows you to measure and to have an acceptable signal/noise ratio. Ohm's law can then be used to extract the wire resistance. The wire resistance can be directly correlated to the temperature of the wire. Unlike hot-wire anemometers, the temperature of these sensors is expected to fluctuate but generally stay at a temperature approximately that of the medium surrounding the sensor. In some embodiments, the temperature sensor is configured to maintain the wire within +/−10% of the temperature of the medium surrounding the sensor in Kelvin. In a preferred embodiment, the temperature sensor is configured to maintain the wire within +/−20 degrees C. from the temperature of the medium surrounding the sensor. In a more preferred embodiment, the temperature sensor is configured to maintain the wire within +/−10 degrees C. from the temperature of the medium surrounding the sensor. In an even more preferred embodiment, the temperature sensor is configured to maintain the wire within +/−5 degrees C. from the temperature of the medium surrounding the sensor. In a still more preferred embodiment, the temperature sensor is configured to maintain the wire within +/−2.5 degrees C. from the temperature of the medium surrounding the sensor. In a most preferred embodiment, the temperature sensor is configured to maintain the wire within +/−1 degrees C. from the temperature of the medium surrounding the sensor.

The sensor may control the temperature of the wire in a variety of ways known to those skilled in the art, but typically this may be accomplished by controlling the current flowing through the wire. In a preferred embodiment, the current flowing through the wire is about 1.0 milliamp or less. In a more preferred embodiment, the current flowing through the wire is about 0.5 milliamps or less. In a still more preferred embodiment, the current flowing through the wire is about 0.1 milliamps or less. In a still more preferred embodiment, the current is about 0.05 milliamps or less. Further, because of the speed at which this sensor responds, this sensor can also be configured so that the temperature of the wire can be less than the temperature of the medium surrounding the sensor for only a very short period of time. In one embodiment, this period of time is less than 1/f, where f is the frequency response. For example, with a frequency response of 3 kHz, the sensor can be configured to reach the temperature of the fluid or medium surrounding the sensor within $1/3000 = 0.333$ milliseconds. In preferred embodiments, this time is less than 0.5 milliseconds. In more preferred embodiments, this time is less than 1 millisecond. And in even more preferred embodiments, this time is less than 10 milliseconds. And in still more preferred embodiments, this time is less than 100 milliseconds.

The exact configuration and design parameters will determine the range of frequencies at which a given sensor can accurately measure temperatures. In preferred embodiments, the sensor is adapted for measuring temperature at wide range of frequencies. For example, in one preferred embodiment, the sensor can accurately measure temperatures at substantially all frequencies less than 10 kHz. In a more preferred embodiment, the sensor can accurately measure temperatures at substantially all frequencies less than 100 kHz.

These sensors may be utilized in a variety of applications. The choice of application will impact the configuration of the sensor and determine if additional components, special housing, or other element is needed. In particular, it is envisioned that these sensors may be configured for specific applications, such as acquiring data in heat transfer applications, high speed moving vehicles, or real-time monitoring of engines, mobile devices, or computer chips. In some instances, the sensors may be further configured for remote monitoring and storage of data, through wireless or wired connections.

What is claimed:
1. A temperature sensor system, comprising:
   a temperature sensor comprising:
   at least two prongs, and each prong having an l/d ratio of $1 \leq l/d \leq 25$,
   where l is a length of the prongs and d is a maximum diameter or width of the prong;
   a subminiature, free-standing sensor element comprising a conductive material suspended between the prongs, the sensor a constant current circuit configured to maintain a current through the sensor element, wherein the temperature sensor system is configured to maintain the sensor element at a temperature approximately that of the medium surrounding the sensor, and wherein the sensor element is configured such that a one degree C. change in the temperature of the medium surrounding the sensor results in energy storage in the sensor element of between and including 50 pJ and 200 pJ.

2. The temperature sensor system according to claim 1, wherein the sensor element is configured to maintain at a temperature +/−10 degrees C. of the medium surrounding the sensor.

3. The temperature sensor system according to claim 1, wherein the sensor element is configured to maintain the current at less than 0.1 milliamps.

4. The temperature sensor system according to claim 1, wherein the conductive material is comprised of a metal wire.

5. The temperature sensor system according to claim 1, wherein the conductive material is comprised of platinum.

6. The temperature sensor system according to claim 1, wherein a ratio of the length of the conductive material to the diameter or width of a rectangular cross-section of the conductive material is greater than 20.

7. The temperature sensor system according to claim 5, wherein the ratio of the length of the conductive material to the diameter or width of a rectangular cross-section of the conductive material is between 50 and 200.

8. The temperature sensor system according to claim 5, wherein the length of the conductive material is between 150 and 250 μm, the rectangular cross-section of the conductive material has a width of between 1 and 3 μm, and the thickness of the conductive material is between 50 and 150 nm.

9. The temperature sensor system according to claim 1 wherein the prongs are comprised of gold.

10. The temperature sensor system according to claim 1 wherein the prongs are comprised of platinum covered with gold.

11. The temperature sensor system according to claim 1 wherein the prongs are comprised of two layers of metal, one layer having conductivity that is higher than the other layer.

12. The temperature sensor system according to claim 1, wherein each prong comprises at least one stub, and wherein the conductive material is suspended between the prongs via a stub.

13. The temperature sensor system according to claim 1, wherein the sensor is configured for acquiring data in heat transfer applications, high speed moving vehicles, or real-time monitoring of engines, mobile devices, or computer chips.

14. The temperature sensor system according to claim 1, wherein the sensor is adapted for measuring temperature at frequencies less than 100 kHz.

15. The temperature sensor system according to claim 1, wherein the sensor is adapted to increase the temperature of the sensor element to at least the temperature of the medium surrounding the sensor, within a time period of less than or equal to 1/f, where f is a frequency response in Hz, and wherein the time period begins whenever the temperature of the sensor element is less than the temperature of the medium surrounding the sensor, and wherein the time period is less than 10 milliseconds.

* * * * *